US009689697B2

(12) United States Patent
Sorokin et al.

(10) Patent No.: US 9,689,697 B2
(45) Date of Patent: Jun. 27, 2017

(54) METHOD FOR OPERATING A NAVIGATION SYSTEM OF A MOTOR VEHICLE, NAVIGATION SYSTEM AND MOTOR VEHICLE

(71) Applicant: Bayersiche Motoren Werke Aktiengesellschaft, Munich (DE)

(72) Inventors: Lenja Sorokin, Munich (DE); Gunnar Franz, Ottobrunn (DE); Christopher Roelle, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/313,037

(22) Filed: Jun. 24, 2014

(65) Prior Publication Data
US 2014/0379252 A1 Dec. 25, 2014

(30) Foreign Application Priority Data

Jun. 25, 2013 (DE) .................. 10 2013 211 980

(51) Int. Cl.
*G01C 21/34* (2006.01)
(52) U.S. Cl.
CPC .................. *G01C 21/3461* (2013.01)
(58) Field of Classification Search
CPC ........ G01C 21/00; G01C 21/26; G01C 21/28; G01C 21/30; G01C 21/34; G01C 21/36; G01C 21/3605; G01C 21/3461; G01C 21/3691; G01C 21/3694
See application file for complete search history.

(56) References Cited

U.S. PATENT DOCUMENTS

| 6,898,432 | B1 * | 5/2005 | Jiang ...................... H04W 4/04 370/310.2 |
| 8,311,741 | B1 * | 11/2012 | Lawther et al. .............. 701/527 |
| 8,676,502 | B2 * | 3/2014 | Petersen ................ G01C 21/28 455/446 |
| 2002/0029108 | A1 | 3/2002 | Liu et al. |
| 2006/0135180 | A1 * | 6/2006 | Jakel et al. ................. 455/456.5 |
| 2008/0009324 | A1 * | 1/2008 | Patel ............................. 455/566 |

(Continued)

FOREIGN PATENT DOCUMENTS

| DE | 196 11 915 A1 | 10/1997 |
| DE | 10 2009 047 395 A1 | 6/2011 |

(Continued)

OTHER PUBLICATIONS

German Search Report dated Mar. 6, 2014, with Statement of Relevancy (Five (5) pages).

*Primary Examiner* — Adam Tissot
*Assistant Examiner* — Tamara Weber
(74) *Attorney, Agent, or Firm* — Crowell & Moring LLP

(57) ABSTRACT

The invention relates to a method for operating a navigation system of a motor vehicle by receiving an input by means of an input device of the navigation system, a destination being indicated by way of the input; as well as by determining at least one conceivable route from a starting position to the destination by an arithmetic device of the navigation system by means of filed map data, wherein, for at least one route section of the at least one conceivable route, at least one parameter of at least one wireless communication network is determined by the arithmetic device.

17 Claims, 2 Drawing Sheets

(56) References Cited

U.S. PATENT DOCUMENTS

| | | | |
|---|---|---|---|
| 2008/0183380 A1* | 7/2008 | Blackwood | G01C 21/26 701/420 |
| 2012/0271497 A1 | 10/2012 | Klein-Besten et al. | |
| 2013/0024107 A1* | 1/2013 | Xie et al. | 701/423 |
| 2014/0067257 A1* | 3/2014 | Dave | G01C 21/3461 701/423 |
| 2014/0257695 A1* | 9/2014 | Annapureddy | G08G 1/096811 701/537 |

FOREIGN PATENT DOCUMENTS

| | | |
|---|---|---|
| DE | 10 2009 060 358 A1 | 6/2011 |
| EP | 1 085 297 B1 | 5/2003 |

* cited by examiner

METHOD FOR OPERATING A NAVIGATION SYSTEM OF A MOTOR VEHICLE, NAVIGATION SYSTEM AND MOTOR VEHICLE

CROSS REFERENCE TO RELATED APPLICATIONS

This application claims priority under 35 U.S.C. §119 from German Patent Application No. 10 2013 211 980.1, filed Jun. 25, 2013, the entire disclosure of which is herein expressly incorporated by reference.

BACKGROUND AND SUMMARY OF THE INVENTION

The invention relates to a method for operating a navigation system of a motor vehicle. By means of an input device of the navigation system, an input is received, by way of which a destination is indicated. Then at least one conceivable route from a starting position to the destination is determined by an arithmetic device of the navigation system by means of filed map data. In addition, the invention relates to a navigation system, which is constructed for implementing such a method, as well as to a motor vehicle having such a navigation system.

Navigation systems for motor vehicles are known from the state of the art in multiple configurations. All navigation systems have in common that first the destination is to be defined in that, for example, a corresponding input is carried out by a user at an input device of the navigation system. The known navigation systems usually also have a navigation receiver, such as a GPS receiver, by means of which position signals are provided which characterize the respective momentary position of the motor vehicle. When the current geographical position of the motor vehicle is known (in geo coordinates), this geographical position can be matched by means of a so-called map-matching process with the location information or a road network of a digital road map. In this case, the measured geographical coordinates of the motor vehicle are imaged in the coordinate system of a digital map, so that the current position of the motor vehicle is determined on the digital map. When the current position on the map is known, by means of the navigation system, a route can be computed from the current position to the defined destination. In this context, many different methods are known, as to how such a navigation route can be computed. Thus, the user can, for example, define optimizing criteria, according to which the route to the defined destination is to be determined. In this respect, it is, for example, already the state of the art to choose between a "fast" route, on the one hand, and a "short" route, on the other hand. The user normally needs to make the corresponding adjustments with respect to the criteria once, so that the selection of the best possible route according to the specified criteria automatically takes place by the navigation system. Once the criteria have been defined, they can also be changed by the user at any time.

A navigation system is known, for example, from European Patent Document EP 1 085 297 A1, in which criteria defined by the user are taken into account when computing the navigation route.

A method for the route inquiry and the route guidance of motor vehicles by applying one or more locating methods is known from German Patent Document DE 196 11 915 A1. In this case, a mobile radio system is used consisting of mobile radio terminals and a mobile radio network. Upon a user inquiry, a route planning takes place in a central station, which is carried out according to specified optimizing criteria. An individual route description is generated in the central station and is transmitted to a terminal and processed there.

From German Patent Document DE 10 2009 047 395 A1, a method is known for controlling a hybrid drive of a vehicle, the hybrid drive having an electric drive and a fuel drive. A database is then provided, which has assignments between route information and first as well as second route criteria. The route information represents routes that can be driven by the vehicle, while the first route criterion represents a preferred use of the electric drive on the respectively assigned route, and the second route criterion represents a preferred use of the fuel drive on the respectively assigned route. With respect to a currently received route information, a current route criterion assigned to the current route information will then be determined from the database and control information will be provided, on the basis of which the electric drive is used when the current route criterion is the first criterion, or the fuel drive is used when the current route criterion is the second route criterion.

It is an object of the invention to improve the usability of a navigation system of a motor vehicle in comparison to the prior art.

According to the invention, this method is implemented by a navigation system as well as by a motor vehicle having the characteristic according to the respective independent claims. Advantageous embodiments of the invention are the object of the dependent claims, of the description and of the figures.

A method according to the invention is used for operating a navigation system of a motor vehicle. An input is received by means of an input device of the navigation system, by way of the input, a destination being indicated. This input can be carried out at the input device, for example, by a user who defines the destination himself. An arithmetic device of the navigation system then determines at least one conceivable route from a starting position to the destination by means of filed map data. According to the invention, it is provided that, for at least one route section of the at least one possible route, at least one parameter—for example, a reception strength or availability and/or a capacity utilization—of at least one wireless communication network provided on the route is determined by the arithmetic device; in particular, is determined ahead of time before the starting of a route guidance or navigation to the destination.

The usability or the acceptance of the navigation system with respect to the state of the art is therefore improved in that, for at least one route section of the determined conceivable route, and particularly for the entire conceivable route, the parameter—such as particularly the signal strength and/or a capacity utilization—of a least one wireless communication network is determined, for example, particularly of a mobile radio network. In this manner, it can, for example, be achieved for the final route guidance or for the navigation to the destination, to select that route by which the greatest availability of the at least one wireless communication network is provided. This may mean, for example, that a route can be selected for the route guidance which permits a relatively long utilization of the network without interruption and/or the network coverage is the largest. However, it is also possible to inform the user of the navigation system of the determined availability and/or capacity utilization of the communication network, so that the user is informed of the features of the communication network along the route.

Within the scope of the invention, a "communication network" is a wireless data transmission network, in the case of which data are transmitted at least unidirectionally—and particularly bidirectionally—according to an arbitrary specified data transmission standard and thereby a specified standardized communication protocol. Generally, the term "communication" may comprise a digital telephony and/or a—for example, packet-oriented—information transmission.

The determination of the at least one parameter means, in particular, that a spatial course of values of this parameter is determined along the at least one route section of the conceivable route. Preferably, a current value range of this parameter is determined in this case for the at least one route section, particularly the entire route. However, optionally, an anticipated value range of the parameter can be determined along the at least one route section for a later time period. For example, it can in each case be determined for a plurality of route sections of the route at which point in time the motor vehicle will probably be situated on the respective route section, and the arithmetic device can ahead of time determine of the parameter of the communication network for the respective route section at the determined point in time. This has the advantage that possibly existing network gaps can be determined early ahead of time.

Thus, the at least one route is determined from the starting position to the destination. In this case, for example, a current geographical position of the motor vehicle can be determined as the starting position by means of position signals of a navigation receiver, as, for example, by means of signals of a GPS receiver, thus, generally, of a satellite-based receiver. However, the starting position may also be defined by the user himself in that a corresponding input is carried out at the input device. Furthermore, it is also conceivable that that starting position is obtained by means of the arithmetic device from a digital calendar. Here, the arithmetic device can check by means of calendar data or appointment data in which geographical position of the motor vehicle will probably be situated at a certain point in time.

As mentioned above, a receiving strength of the communication network on the at least one conceivable route can be determined as a parameter by the arithmetic device. In addition or as an alternative, it may also be provided that a capacity utilization of the communication network on the at least one conceivable route is determined as a parameter by the arithmetic device. Both parameters represent a reliable measurement of the quality of the communication network, so that correspondingly a respectively optimal route can be selected on which, for example, a long and interruption-free telephoning is possible.

In an embodiment, it is provided that at least two mutually different conceivable routes are determined for a route guidance from the starting position to the destination and, in each case, for at least one route section of the routes, the at least one parameter of the wireless communication network is determined. As a function of a comparison of the respective routes with respect to the at least one parameter, one of the conceivable routes can then be selected for a navigation to the destination or for the route guidance by the arithmetic device. This means that the finally selected navigation route can be calculated or selected according to an optimizing criterion with respect to the signal strength and/or capacity utilization of the communication network, so that, for example, that navigation route is selected which has the best availability of the wireless communication network. When this route-optimizing criterion is activated, particularly interruptions of telephone calls can thereby be avoided, or situations are prevented in which important telephone calls are interrupted during the drive because of a lack of mobile radio reception or a large capacity utilization. In addition, it is thereby ensured that communication devices possibly present in the vehicle can communicate without interruption with central server devices if the same communication network is also used for this communication.

It may, for example, be provided that the user of the navigation system selects a route-optimizing criterion, according to which the final navigation route is to be optimized with respect to the availability and/or capacity utilization of the communication network. For example, such an optimizing criterion "interruption-free cell phone" can also be combined with another criterion, such as "fastest route" or "shortest route". When the route-optimizing criterion concerning the availability of the communication network is selected, the arithmetic device can then select that route as the final navigation route which has the best availability of the wireless communication network.

However, it is also possible that the above-mentioned route-optimizing criterion concerning the at least one parameter is autonomously activated by the navigation system. This may take place, for example, when, by means of the filed data—for example, data of a digital personal calendar of the user—the navigation system detects that the utilization of the communication network by the user is intended during the drive, thus, for example, that the user intends to telephone during the drive.

An adjustment of the reception quality on the different routes can, on the one hand, take place by means of data of a digital calendar and, on the other hand, by means of the arithmetic device. By means of the calendar data, it can be determined at which point in time the driver probably intends to telephone, and respective route sections of the routes can be determined on which the motor vehicle would probably travel at this point in time. These route sections of the different route can then be compared with one another with respect to the at least one parameter, and that route can be selected on which the telephoning can take place without interruptions at the determined point in time. In this case, the planned length of the telephone calls may also be determined.

It may optionally also be provided that, after the selection of the final navigation route, the determined parameter—therefore particularly the reception intensity and/or capacity utilization—of the communication network is displayed on a display of the navigation system. In this manner, the user—particularly the driver—will be informed of the availability of the communication network on the suggested navigation route. Such a representation of the availability may be such on the display that the at least one parameter of the communication network is displayed in a map representation. For example, a route section of the route situated ahead may be provided with corresponding information concerning the reception strength and/or the capacity utilization of the communication network.

It is, however also possible to indicate the determined parameter of the communication network at the at least one possible route on the display even before a final navigation route is selected for the route guidance. Here also, the availability of the communication network can be displayed at the at least one possible route in a map representation. When the arithmetic device determines, for example, two different possible routes, which lead to the defined destination, these routes can be displayed on the display together with the information concerning the reception strength and/ or the network capacity utilization of the communication network, so that the user can select one of the routes fir the route guidance. This embodiment is particularly advantageous when the route with the best network reception is clearly longer than other conceivable routes which do not have such a good network reception.

Here, the driver can decide himself whether he would rather like to select a shorter route with a poorer network reception or a longer route with a better network reception.

In an embodiment, it may be provided that, during a navigation to the destination or during the route guidance along an already selected navigation route, a communication device of the motor vehicle—such as a mobile radio device or telephone system—is activated by way of which a communication connection is established to the communication network. The establishing of this communication connection can then be detected by the navigation system, and, after the detection, the arithmetic device can check the at least one parameter, particularly the reception strength and/or the capacity utilization of the communication network with respect to a route section situated ahead. When the communication network is a mobile radio network, it can be checked by means of the calculation device whether or not a sufficient mobile radio reception will soon be available. In this manner, the user can be reliably assisted—for example, when telephoning.

When it is detected by the arithmetic device that, for example, the parameter on the route section situated ahead is in a specified value range, thus, for example, the signal strength is lower than a specified limit value, and/or capacity utilization is higher than a specified limit value, the arithmetic device can determine a current distance to this route section and/or a time before this route section will be reached, and can output it by means of an output device, particularly by means of a display. The user is thereby informed as to how long the communication connection will still be maintained. The user can thereby better prepare himself for an interruption of the communication connection. For example, he can thereby himself still terminate the current telephone calls before the interruption of the connection.

The determination of the reception quality of the communication network preferably takes place by means of a digital network coverage map of the communication network. By means of such a network coverage map, the parameter of the communication network can, on the one hand, be determined very reliably and precisely and, on the other hand, without many computing expenditures and mainly without additional measuring devices.

In this case, the network coverage map can be filed on a central, vehicle-external server device, so that the network coverage map will be available to a plurality of motor vehicles, which can communicate with the central server device. Therefore, a wireless communication connection can be established between the navigation system and the vehicle-external central server device, by which wireless communication connection at least a part of the digital network coverage map is transmitted from the server device to the navigation system. In this case, the selection of the required part of the map can take place as a function of the situation and according to the requirements, specifically as a function of the starting position—particularly the current position of the motor vehicle—and as a function of the destination, particularly as a function of the determined at least one conceivable route.

When the network coverage map is filed centrally on the server device, a so-called "crowd-sourcing" can also be carried out: A plurality of motor vehicles can in each case transmit data to the server device, which data contain information concerning the current position of the respective motor vehicle as well as concerning the current, particularly measured, value of the at least one parameter of the communication network at the respective motor vehicle. By means of these data, the network coverage map in the server device can always be updated, so that also time fluctuations of the network availability can be taken into account. A current and highly precise network coverage map is therefore always available.

The central server device can use the received data also for determining such a network coverage map ahead of time for a later time period. Specifically, by means of a statistical analysis of the data, time patterns (for example, course of the day) of the reception quality of the communication network can be determined, which can then be used for predicting the reception quality by means of the central server device. A network coverage map can thereby be provided which has a time-related dimension and in which information is therefore listed concerning the probable network quality.

A mobile radio network is preferred whose reception quality is determined on the at least one route section of the at least one conceivable road by means of the arithmetic device. Navigation routes can therefore be provided on which the driver can telephone without interruptions.

However, in addition or as an alternative, it may be provided that the reception quality of an ad-hoc network and/or of a public WLAN-network (Hotspot Network) is determined on the at least one route section. In this respect, it can also be provided that the arithmetic device determines whether the ad-hoc network or the public WLAN network has the better reception quality, so that, as required, an automatic change can be implemented between the two networks as a function of the reception strength.

Generally, it can also be provided that, for the at least one conceivable route, the reception features or the at least one parameter of at least two separate communication networks are determined by means of the arithmetic device. When at least two networks are present on the conceivable route, as required, a selection can be made between different communication networks as a function of the respective network quality.

A navigation system for a motor vehicle according to the invention is constructed for implementing a method according to the invention.

A motor vehicle according to the invention, particularly a passenger car, comprises a navigation system according to the invention.

The preferred embodiments introduced with respect to the method according to the invention and their advantages correspondingly apply to the navigation system according to the invention as well as to the motor vehicle according to the invention.

Further characteristics of the invention are contained in the claims, the figures and the description of the figures. All characteristics and combinations of characteristics indicated in the specification as well as the characteristics and combinations of characteristics indicated in the following in the description of the figures and/or illustrated only in the figures can be used not only in the respectively indicated combination but also in other combinations or alone.

The invention will now be explained in detail by means of a preferred embodiment as well as with reference to the attached figures.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
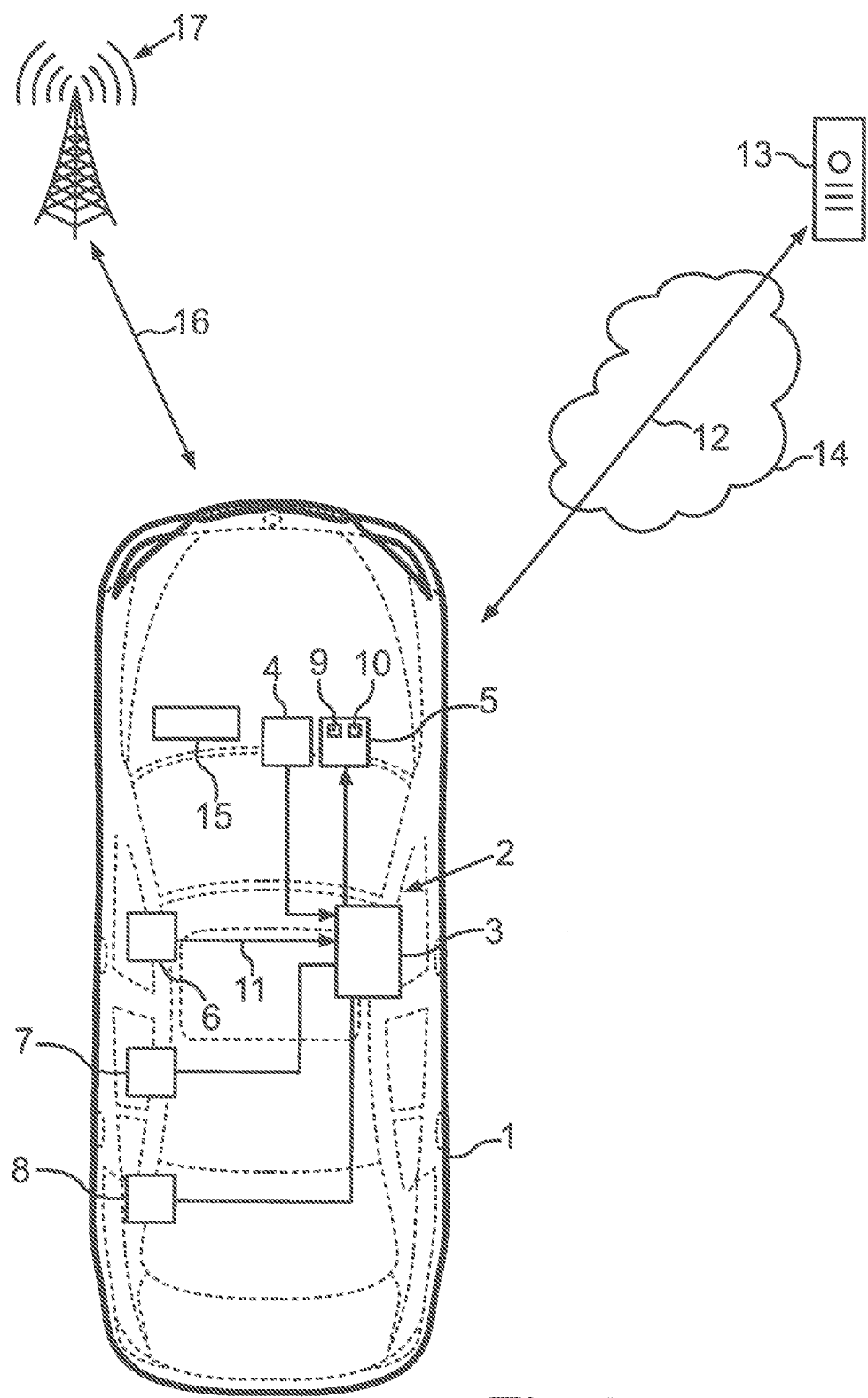
FIG. 1 is a schematic view of a motor vehicle with a navigation system according to an embodiment of the invention.

A motor vehicle 1 illustrated in FIG. 1, for example, is a passenger car. The motor vehicle 1 contains a navigation system 2, which is fixedly installed in the motor vehicle 1 in the embodiment. The navigation system 2 comprises an arithmetic device 3, which is coupled with an input device 4, an output device 5, a navigation receiver 6, a data memory 7 as well as a communication interface 8.

The output device 5 contains, for example, in addition to a display 9, also a loudspeaker 10 and, as a whole, is used for the output of information to the driver of the motor vehicle 1. The navigation receiver 6, for example, is a GPS receiver. The navigation receiver 6 provides position signals 11, by means of which the arithmetic device 3 can determine a current geographical position of the motor vehicle 1. In the data memory 7, map data are in turn filed, i.e. a digital road map, which the arithmetic device 3 can access. By way of the communication interface 8, the arithmetic device 3 can establish a communication connection 12 to a vehicle-external central server device 13, specifically by way of the Internet 14.

The communication interface 8 may comprise, for example, a mobile radio module (for example, a GSM, GPRS, UMTS or LTE) with an assigned mobile radio card (SIM) also permanently installed in the motor vehicle, for the communication with the server device 13. Such a data communication between a motor vehicle 1 and a server device 13 is made possible, for example, by the "BMW ConnectedDrive" system offered by the applicant.

In addition, the motor vehicle 1 contains a communication device 15, which is constructed, particularly as a telephone system and is used for telephoning. In this case, basically two embodiments are provided: On the one hand, the communication device 15 can be connected by way of a wireless data connection (such as Bluetooth®) with a driver's mobile telephone. The communication device 15 will then operate as a loudspeaker system and is connected for this purpose, for example, with the output device 5 as well as a microphone. However, on the other hand, it may be provided that the communication device 15 permits the telephoning by way of the communication interface, which—as mentioned above—can be linked to a mobile radio network.

Independently of the technical implementation, the communication device 15 is used for establishing a communication connection 16 to a mobile radio network 17. Telephone calls can be made by way of this communication connection 16.

The mobile radio network 17 represents a communication network in the sense of the present invention. In addition or as an alternative it is also conceivable that such a communication connection 16 can be provided between the motor vehicle 1, on the one hand, and, for example, an ad-hoc network and/or a WLAN network, on the other hand. For this purpose, the communication interface 8 can, for example, be set up correspondingly.

On the server device 13, a network coverage map of the mobile radio network 17 is provided. Such a network coverage map can be provided particularly for several mobile radio providers. It may, on the one hand, be made available by the respective mobile radio provider. On the other hand, a so-called "crowd-sourcing" is also conceivable, by which a plurality of motor vehicles 1 transmit data to the server device 13, which contain information concerning the current geographical position together with the reception quality of the mobile radio network 17. The network coverage map can then be very precisely prepared or refined in the server device 13.

Figure 2:
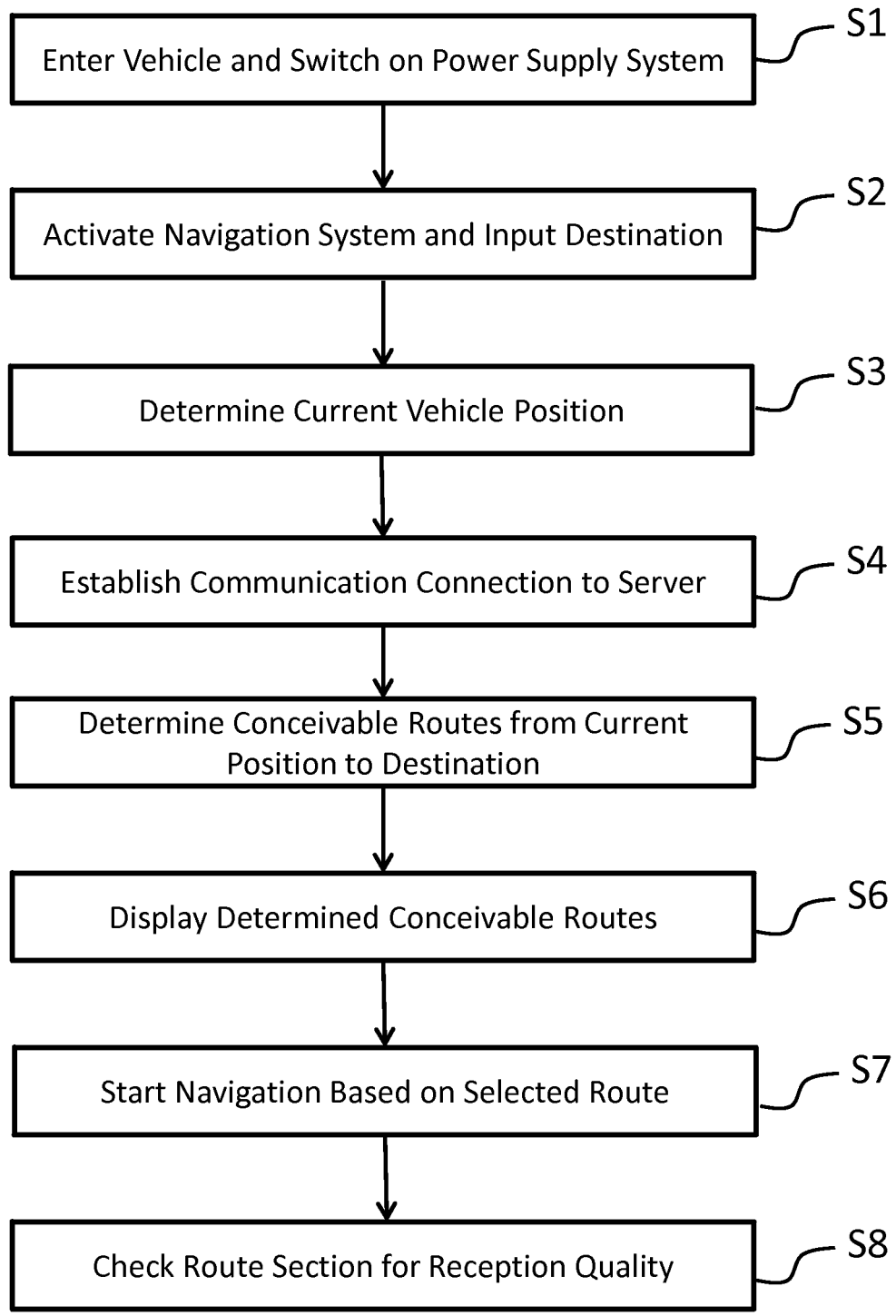
FIG. 2 is a flow chart of a method according to an embodiment of the invention.

A method according to the embodiment of the invention will be described in detail in the following with reference to FIG. 2.

According to a first Step S1, the driver enters the motor vehicle 1 and switches on the onboard power supply system, so that the above-mentioned data connection is established between his mobile telephone and the communication device 15. The arithmetic device 3, which is coupled with the communication device 15, then identifies the available networks or the mobile radio provider of the mobile telephone.

In a further Step S2, the driver activates the navigation system 2 and inputs the desired destination at the input device 4, to which destination the navigation system is to guide the driver while outputting corresponding navigation advice. According to Step 2, the driver additionally also defines the optimizing criteria according to which the route to the destination is to be determined by the arithmetic device 3. Here, the driver selects an optimizing criterion "interruption-free cell phone reception." In addition, he can also select a further criterion, such as "fast route" or "short route". As an alternative, the optimizing criterion "interruption-free cell phone reception" can also be activated automatically by the arithmetic device 3, when it is determined, for example, by means of calendar data that the driver intends to telephone during the drive.

In a further Step S3, the arithmetic device 3 determines the current position of the motor vehicle 1 on the digital map, which is filed in the data memory 7. For this purpose, the position signals 11 of the navigation receiver 6 are also used. Here, the so-called "map matching" takes place. At this point, it should be noted that, as an alternative, the digital map data may also be filed on the central server device 13 and only a part of the digital map may be transmitted to the motor vehicle 1. As required, a different position may also be used as the starting position, as, for example, a position inputted by the user himself.

In a further Step S4, the arithmetic device 3 establishes the communication connection 12 to the server device 13, and the arithmetic device 3 accesses the network coverage map of the identified mobile radio provider made available in the server device 13. Here, for example, a part of the network coverage map can be transmitted to the arithmetic device 3, specifically particularly a region in which the current position of the motor vehicle 1 as well as the destination are situated.

In a further Step S5, the arithmetic device 3 determines several conceivable routes from the current position to the destination. For each conceivable route, the arithmetic device 3 additionally also determines the reception quality of the mobile radio network 17 (and/or of the above-mentioned ad-hoc network and/or of the WLAN network) by means of the network coverage map. This may, for example, include that a spatial course of the reception strength or signal strength and/or capacity utilization of the mobile radio network 17 is determined by way of the respective conceivable route. The conceivable routes are then compared with one another according to Step S6 with respect to the availability of the mobile radio network, and that route is selected for the navigation to the destination which has the best availability of the mobile radio network 17, i.e., particularly which has the largest coverage of the mobile radio network 17 and/or in the case of which a long interruption-free telephoning is possible.

According to Step S5, an adjustment of the reception quality on the different routes can be carried out, on the one hand, to the data of a digital calendar or organizer, on the other hand, by means of the arithmetic device 3. By means of the calendar data, it can be determined at which point in time the driver probably intends to telephone, and respective route sections of the routes can be determined which at this point in time would probably be traveled by the motor vehicle 1. These route sections of the different routes can then be compared with one another with respect to the network quality, and that route can be determined on which at the determined point in time the telephoning can take place without interruptions.

In a further Step S7, the navigation will then be started corresponding to the selected navigation route, and the navigation route can, for example, be displayed in a map representation on the display 9 together with the availability of the mobile radio network 17.

According to Step S6, it is also possible to display the conceivable routes with the respective availability of the mobile radio network 17 on the display, even before one of the routes is selected as the navigation route. Optionally, the driver may be provided with the possibility of himself selecting one of the displayed routes.

As mentioned above, according to Step S7, the navigation to the destination is started corresponding to the selected navigation route. When it is then detected during the navigation by the arithmetic device 3 according to Step S8 that the driver has established the communication connection 16 by way of the communication device 15 and is therefore telephoning, by means of the arithmetic device 3, a route section situated ahead can be checked with respect to the reception quality of the mobile radio network 17. When it is determined, for example, that no reception exists on a defined route section which is situated ahead of the motor vehicle 1, the arithmetic device 3 will detect the current distance of the motor vehicle 1 from this route section and/or the time until it will be reached. This information can then be supplied to the driver by way of the output device 5.

This functionality can also be provided by the navigation system 2 even when the driver does without the route-optimizing criterion "interruption-free cell phone reception" according to Step S2 and another route is selected which is not optimized with respect to the network quality. Also in this situation, the arithmetic device 3 can detect that the driver has established the communication connection 16 by way of the communication device 15 and is therefore telephoning. By means of the arithmetic device 3, a route section situated ahead is checked here with respect to the reception quality of the mobile radio network 17, and, as required, warning signals can be outputted to the driver if the reception quality of the route section situated ahead is insufficient.

When at least two communication networks on the route are known to be available, specifically particularly an ad-hoc network and a WLAN network, the selection of the currently used communication network for a communication with the Internet 14 can take place as a function of the network availability or of the reception strength. An automatic change takes place, for example, into the respective better data connection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a navigation system of a motor vehicle, the method comprising the acts of:
   receiving an input by an input device of the navigation system, a destination being indicated by way of the input;
   determining at least one conceivable route from a starting position to the destination by an arithmetic device of the navigation system based on filed map data;
   receiving, by the arithmetic device, network coverage map data from a first wireless communication network;
   determining, by the arithmetic device for at least one route section of the at least one conceivable route, a parameter of a second wireless communication network based on the received network coverage map data, wherein the second wireless communication network is independent of the first wireless communication network; and
   displaying the parameter of the second wireless communication network on a display of the navigation system in a map representation;
   establishing a communication connection by way of a communication device of the motor vehicle to the second wireless communication network, independently of the first wireless communication network, during a navigation to the destination along a selected navigation route;
   detecting, by way of the navigation system, the established communication connection to the second wireless communication network;
   checking, by the arithmetic device, the parameter of the second wireless communication network on a route section situated ahead, wherein checking the parameter occurs after and in response to detecting the established communication connection; and
   displaying, on the display, information based on the detection and the parameter of the second communication network on the route section situated ahead.

2. The method according to claim 1, wherein, for the at least one route section, a reception strength of the second wireless communication network is determined as the parameter by the arithmetic device.

3. The method according to claim 1, wherein, for the at least one route section, an anticipated capacity utilization of the second wireless communication network is determined as the parameter by the arithmetic device.

4. The method according to claim 1, wherein at least two mutually different conceivable routes from the starting position to the destination are determined and, in each case, for at least one route section of the routes, the parameter of the second wireless communication network is determined based on a comparison of the respective parameter values, one of the conceivable routes being selected by the arithmetic device as the navigation route for a navigation to the destination.

5. The method according to claim 4, wherein, after the selection of the navigation route, the parameter of the second wireless communication network is displayed on a display of the navigation system in a map representation.

6. The method according to claim 1, wherein, before a conceivable route is selected as the navigation route for a navigation to the destination, the parameter of the second wireless communication network is displayed at the at least one conceivable route on a display of the navigation system in a map representation.

7. The method according to claim 1, wherein, if it is detected by the arithmetic unit that, on the route section situated ahead, the parameter of the second wireless communication network is in a specified value range, wherein the specification value range corresponds to at least one of a reception strength being lower than a specified limit value and a capacity utilization being higher than a specified limit value, at least one of a distance to this route section and a time until this route section will be reached is determined by the arithmetic device and outputted by a display of the motor vehicle.

8. The method according to claim 1, wherein, between the navigation system and a vehicle-external central server device, the first wireless communication connection is established, by way of which at least a part of the digital network coverage map is transmitted by the server device to the navigation system.

9. The method according to claim 1, wherein, in a current position of the motor vehicle, a current value of the parameter is determined, a connection to the first wireless communication network being established between the navigation system and a vehicle-external central server device, wherein the current value of the parameter is transmitted from the navigation system to the server device using said first wireless communication connection.

10. The method according to claim 1, wherein the parameter of the second wireless communication network is determined on the at least one route section by the arithmetic device.

11. The method according to claim 1, wherein the parameter of the second wireless communication network is determined for at least one of an ad-hoc network and a public WLAN network on the at least one route section by the arithmetic device.

12. The method according to claim 1, wherein the network coverage map data is received by the arithmetic device, independently of the second wireless communication network, via a vehicle-external central server device coupled to the first wireless communication network.

13. A navigation system for a motor vehicle comprising:
an input device configured to receive a destination as an input;
an arithmetic device coupled to the input device, wherein the arithmetic device is configured to determine at least one conceivable route from a starting position to the destination based on filed map data;
receiving, by the arithmetic device, network coverage map data from a first wireless communication network;
determining, by the arithmetic device for at least one route section of the at least one conceivable route, a parameter of a second wireless communication network based on the received network coverage map data, wherein the second wireless communication network is independent of the first wireless communication network; and
a display of the navigation system on which the parameter of the second wireless communication network is displayed in a map representation,
wherein the navigation system further comprises a communication device, coupled to the arithmetic unit and configured to establish a communication connection to the second wireless communication network independent of the first wireless communication network,
wherein, during a navigation to the destination along a selected navigation route and after and in response to establishing the communication connection, the arithmetic device is configured to check the parameter of the second wireless communication network on a route section situated ahead of the motor vehicle, and
wherein the display is further configured to display information based on the established communication connection and the checked parameter.

14. The navigation system according to claim 13, wherein, for the at least one route section, the arithmetic device is configured to determine, as the parameter, at least one of a reception strength of the second wireless communication network and an anticipated capacity utilization of the second wireless communication network.

15. The navigation system according to claim 13, wherein the network coverage map data is received by the arithmetic device, independently of the second wireless communication network, via a vehicle-external central server device coupled to the first wireless communication network.

16. A motor vehicle having a navigation system, wherein the navigation system comprises an input device configured to receive a destination as an input and an arithmetic device coupled to the input device, wherein the arithmetic device is configured to (i) determine at least one conceivable route from a starting position to the destination based on filed map data, (ii) receive network coverage map data from a first wireless communication network, (iii) determine, for at least one route section of the at least one conceivable route, a parameter of a second wireless communication network based on the received network coverage map data, wherein the second wireless communication network is independent of the first wireless communication network, wherein the navigation system further comprises:
a display on which the parameter of the second wireless communication network is displayed in a map representation, and
a communication device, coupled to the arithmetic unit and configured to establish a communication connection to the second wireless communication network independently of the first wireless communication network, and wherein, during a navigation to the destination along a selected navigation route and after and in response to establishing the communication connection, the arithmetic device is configured to check the parameter of the second wireless communication network on a route section situated ahead of the motor vehicle,
wherein the display additionally displays information based on the established communication connection and the checked parameter.

17. The motor vehicle according to claim 16, wherein, for the at least one route section, the arithmetic device is configured to determine, as the parameter, at least one of a reception strength of the second wireless communication network and an anticipated capacity utilization of the second wireless communication network.

* * * * *